United States Patent [19]

Miyamoto

[11] Patent Number: 5,173,229
[45] Date of Patent: Dec. 22, 1992

[54] PROCESS FOR PRODUCING PERFORATED CERAMIC

[75] Inventor: Mitsuru Miyamoto, Kariya, Japan

[73] Assignee: NGK Insulators, Ltd., Japan

[21] Appl. No.: 676,699

[22] Filed: Mar. 29, 1991

[30] Foreign Application Priority Data

Mar. 31, 1990 [JP] Japan .................................. 2-86000

[51] Int. Cl.⁵ .............................................. C04B 41/91
[52] U.S. Cl. ........................................ 264/59; 264/67; 264/317
[58] Field of Search ........................... 264/59, 317, 67

[56] References Cited

U.S. PATENT DOCUMENTS

| | | | |
|---|---|---|---|
| 3,539,667 | 11/1970 | Nameishi | 264/56 |
| 4,806,295 | 2/1989 | Trickett | 264/59 |
| 4,867,932 | 9/1989 | Kimura | 264/59 |
| 4,900,491 | 2/1990 | Odink | 264/59 |

Primary Examiner—James Derrington
Attorney, Agent, or Firm—Parkhurst, Wendel & Rossi

[57] ABSTRACT

A fibrous material is placed at a desired place on a preliminarily ceramic shaped body and ceramic powder added thereto. The preliminarily ceramic shaped body, ceramic powder and fibrous material subjected to mold pressing and then to cold isostatic pressing. The resulting shaped material is subjected to removal of the fibrous material and then to firing, thereby a ceramic having desired perforations can be produced.

6 Claims, 4 Drawing Sheets

PROCESS FOR PRODUCING PERFORATED CERAMIC

BACKGROUND OF THE INVENTION (1) Field of the Invention

The present invention relates to a process for producing a perforated ceramic. More particularly, the present invention relates to a process for producing a perforated ceramic, which process can form perforations of desired diameter at desired portions in a ceramic shaped material, without employing machining.

(2) Description of the Prior Art

Ceramic materials such as silicon nitride, silicon carbide, partially stabilized zirconia and the like have excellent properties such as high heat resistance, high abrasion resistance, high hardness, high corrosion resistance and the like, and accordingly are in wide use as mechanical parts. These ceramic materials are finding applications in increasing fields owing to continual improvements, design optimization, etc.

For such ceramic materials, perforations of desired diameter at desired portions are desirable under certain circumstances. For example, in a ceramic turbine blade 1 as shown in FIGS. 4(a) and 4(b), in order to reduce the surface temperature, an air-emitting perforation 3 is provided to form an air film 2 on the surface of the blade 1. Formation of perforations of desired diameter is required also in various other ceramic products such as water jet nozzles fuel injection nozzles, standard test samples, thermocouple elements, pen points and the like.

Ceramic materials having perforations have hitherto been produced by, for example, as shown in FIG. 3, subjecting a ceramic powder to mold pressing, subjecting the resulting shaped material to cold isostatic pressing, subjecting the resulting shaped material to binder calcination, conducting dry processing to form perforations and finally conducting firing, or conducting processing to form perforations after firing. In this case, perforation formation is conducted by the use of a drill, an ultrasonic wave, a laser beam or the like.

In the perforation formation using a drill, an ultrasonic wave, a laser beam or the like, however, it has been impossible to obtain very small perforations of 0.5 mm or less in inside diameter. Further, the depth (length) of perforation has been limited to at best 10 times the inside diameter. Furthermore, in the perforation formation using a laser beam, there has been a problem that the formed perforations have a tapered shape. There has also been a problem that no curved perforation can be obtained.

The present inventor made study in order to solve the above-mentioned problems of the prior art and, as a result, found that very small perforations of less than 0.5 mm in diameter can be formed in a ceramic material without employing machining. The present invention has been completed based on this finding.

SUMMARY OF THE INVENTION

According to the present invention, there is provided a process for producing a perforated ceramic having a perforation, which process comprises placing a fibrous material at a desired place in a ceramic shaped material, subjecting them to cold isostatic pressing, and removing the fibrous material from the resulting shaped material.

The process of the present invention is characterized by placing a fibrous material at a desired place in a ceramic shaped material, subjecting them to cold isostatic pressing, removing the fibrous material from the resulting shaped material, and conducting firing.

These steps of the present process make it possible to produce a ceramic having very small perforations of less than 0.5 mm in diameter at desired portions, without employing machining.

DETAILED DESCRIPTION OF THE INVENTION

Figure 1:
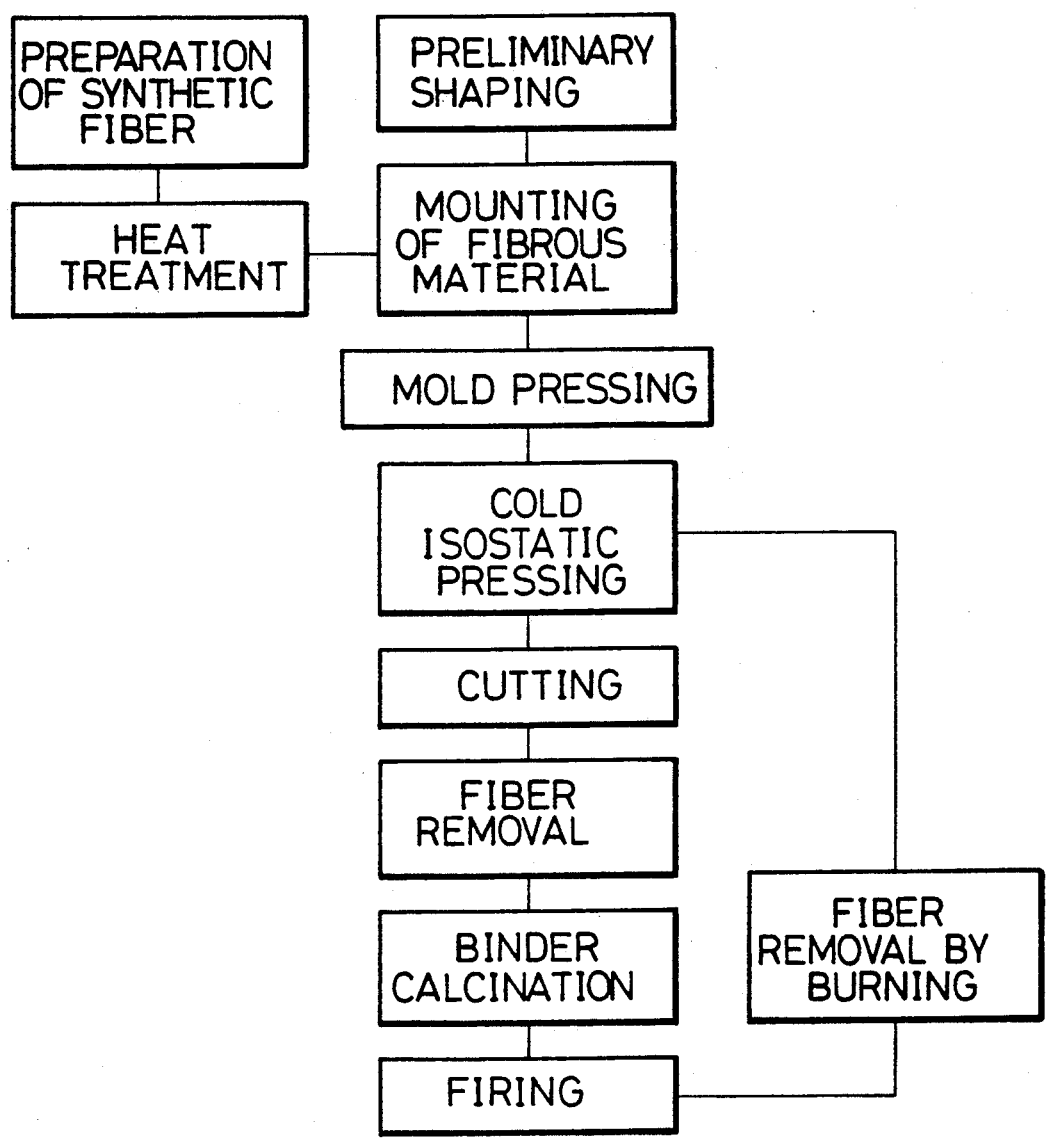
FIG. 1 is a block diagram showing the steps of the process of the present invention.

The present invention is hereinafter described in detail with reference to the process steps of FIG. 1.

First, a fibrous material such as synthetic fiber or the like is prepared. The fibrous material must have a diameter calculated from the factor determined based on a desired perforation diameter and an anticipated shrinkage during calcination and firing. Then, a heat treatment is applied to make the fibrous material straight when the fibrous material is a synthetic fiber. No heat treatment is required when the fibrous material is a metal fiber.

In a mold is placed part (ordinarily about half) of a required amount of a ceramic powder material, and the powder material is subjected to preliminary shaping. On a desired place of the resulting preliminarily shaped material is mounted the above prepared fibrous material. Then, the remainder of the powder material is placed thereon, and they are subjected to mold pressing and cold isostatic pressing in this order. The resulting shaped material is cut and subjected to fiber removal. The fiber-removed shaped material is subjected to binder calcination and firing in this order, whereby a ceramic having desired perforations can be produced.

The type of the fibrous material used in the present invention is not particularly restricted, and there can be used, for example, a synthetic fiber (e.g. nylon yarn, Tetoron yarn, polyester yarn), a piano wire, a metal fiber (e.g. tungsten fiber), a carbon fiber, a ceramic fiber and a natural fiber.

The fibrous material used must have a diameter calculated from the factor determined based on a desired perforation diameter and an anticipated shrinkage during calcination and firing.

The fibrous material is ordinarily used in a straight form but may be used in a curved form. When synthetic fiber is used in a straight form as the fibrous material, it is ordinarily subjected to a heat treatment prior to the use, in order to make it straight. Other fibrous materials such as metal fiber, carbon fiber, ceramic fiber and the like are also subjected to an appropriate treatment as required.

The removal of the fibrous material can be effected not only holding one end of the fibrous material and pulling out, but also by, in the case of a synthetic fiber or a carbon fiber, effecting firing in an oxidizing atmosphere to burn the fiber completely. When the binder calcination is effected in an oxidizing atmosphere, the complete burning of the fibrous material may be effected in the step of this binder calcination.

The present process can be applied to all of generally known ceramics such as alumina, silicon nitride, silicon carbide, partially stabilized zirconia, stabilized zirconia and the like. The present process is particularly effective when applied to silicon nitride, silicon carbide and partially stabilized zirconia, all of which are generally regarded as materials of difficult grinding.

DESCRIPTION OF PREFERRED EMBODIMENTS

The present invention is hereinafter described in more detail with reference to an example shown in FIG. 2. However, the present invention is in no way restricted thereto.

Figure 2A:
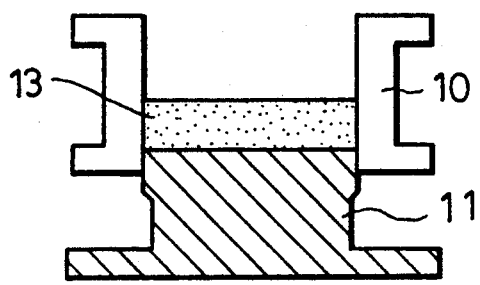
FIG. 2 shows drawings explaining an example of the steps of the present process.
Figure 2B:
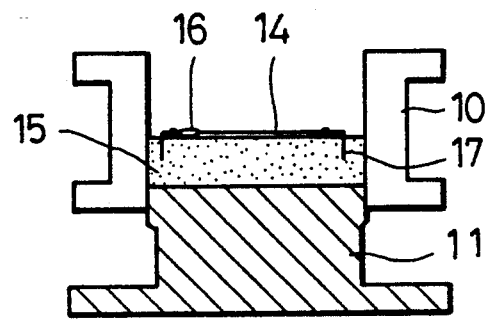

FIGS. 2(a), (b), (c), (d) and (e) explain an example of the steps of the present process. At first, as shown in FIG. 2(a), about half of a required amount of a ceramic powder material 13 is placed in a mold consisting of a cylinder 10, a lower punch 11 and an upper punch 12, and subjected to preliminary shaping at a pressure of 30 kg/cm$^2$. Then, as shown in FIG. 2(b), on a desired place of the resulting preliminarily shaped material 15 is set a fibrous material 14 in a state that the fibrous material is pulled at the both ends by a pulling material 16 such as rubber, spring or the like. In this case, the pulling material 16 is fixed by embedding it into the preliminarily shaped material 15 using fittings 17.

Figure 2C:
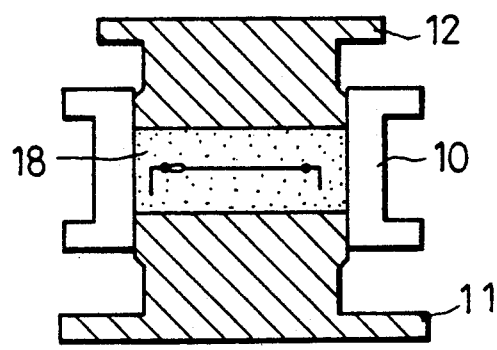
Figure 2D:
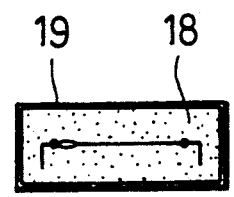
Figure 2E:
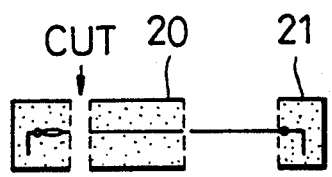
Figure 3:
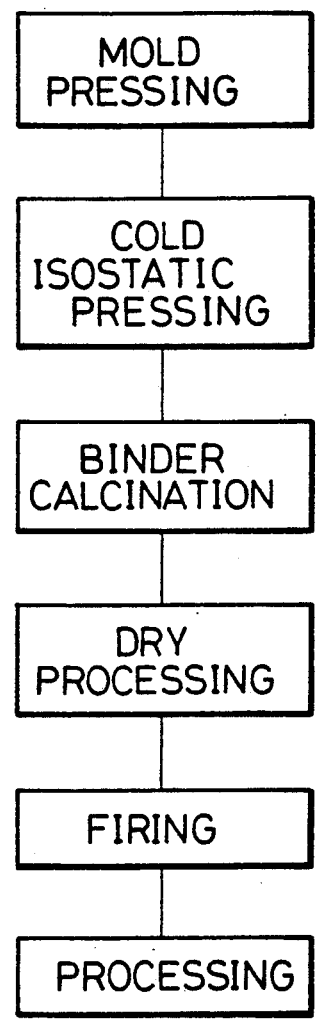
FIG. 3 is a block diagram showing the steps employed in conventional perforation formation.

Thereafter, as shown in FIG. 2(c), the remainder of the powder material 13 is placed on the preliminarily shaped material 15, after which a punch 12 is applied to the powder material 13 at a pressure of 200 kg/cm$^2$ to effect molding to obtain a primary ceramic shaped material 18. Then, the primary ceramic shaped material 18 is placed in a rubber bag 19 and subjected to cold isostatic pressing at a pressure of, for example, 1,000 kg/cm$^2$ [FIG. 2(d)] to obtain a secondary ceramic shaped material 20. The pressure applied for cold isostatic pressing has no particular restriction, but desirably a pressure of 500 kg/cm$^2$ or more is applied to obtain a high-density shaped material. Next, the secondary ceramic shaped material 20 is cut at the left portion as shown in FIG. 2(e). At the right portion, the secondary ceramic shaped material 20 is cut without cutting the fibrous material 14, and the fibrous material 14 is pulled out by holding the piece 21. Thus, a perforated ceramic shaped material is produced.

Then, the perforated ceramic shaped material is calcined at about 400° C. to evaporate the binder, and is fired at a desired temperature in a desired atmosphere, for example, in the case of silicon nitride, at 1,600°–1,800° C. in a nitrogen gas atmosphere, in the case of silicon carbide, at 1,900°–2,200° C. in an argon atmosphere, and in the case of partially stabilized zirconia, at 1,300°–1,500° C. in air, whereby a perforated ceramic sintered material can be produced.

As described above, in the process of the present invention, a ceramic shaped material containing a fibrous material at desired portions is subjected to mold pressing and then to cold isostatic pressing; the shaped material is subjected to fiber removal; and the fiber-removed shaped material is fired to obtain a perforated ceramic. Accordingly, a ceramic having very small perforations of less than 0.5 mm in diameter at desired portions can be obtained without employing machining.

Figure 4A:
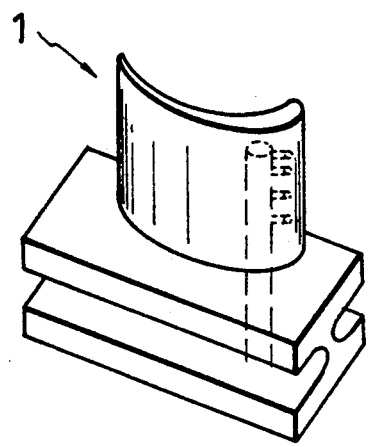
FIGS. 4(a) and 4(b) show a perforated ceramic blade, wherein 4(a) is a perspective view and 4(b) is a cross-sectional view.
Figure 4B:
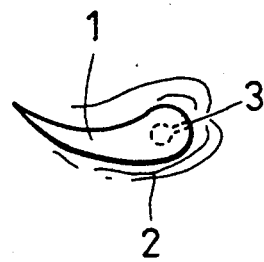
Figure 5:
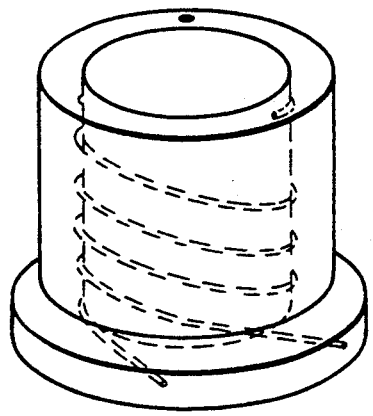
FIG. 5 is a ceramic liner with a cooling perforation.

Therefore, the perforated ceramic produced according to the present process can be advantageously used in various perforated ceramic products such as a perforated ceramic blade as shown in FIG. 4, perforated ceramic liner as shown in FIG. 5, water jet nozzle, fuel injection nozzle, standard test sample, thermocouple element, pen point and the like.

What is claimed is:

1. A process for producing a perforated ceramic body, comprising the steps of:
   placing ceramic powder in a mold;
   shaping said ceramic powder to form a preliminarily shaped body;
   placing a fibrous material on said preliminary shaped body;
   adding ceramic powder to said preliminary shaped body and said fibrous material;
   mold pressing and cold isostatic pressing said preliminary shaped body, said fibrous material and said ceramic powder into a shaped body;
   removing said fibrous material by cutting said shaped body to expose a portion of said fibrous material thereby enabling removal of said fibrous material from said shaped body;
   firing said shaped body.

2. The process of claim 1, wherein said fibrous material is at least one member selected from the group consisting of synthetic fiber, piano wire, metal fiber, carbon fiber, ceramic fiber and natural fiber.

3. The process of claim 1, wherein said ceramic powder is at least one material selected from the group consisting of silicon nitride, silicon carbide and partially stabilized zirconia.

4. A process for producing a perforated ceramic body for use as a high temperature structural member, comprising the steps of:
   placing ceramic powder in a mold;
   shaping said ceramic powder to form a preliminarily shaped body;
   placing fibrous material on said preliminarily shaped body such that said fibrous material is pulled by pulling means, said pulling means and said fibrous material being fixed in place by fitting means, said fitting means being partially embedded in said preliminarily shaped body and attached to said pulling means;
   adding ceramic powder to said preliminary shaped body and said fibrous material;
   mold pressing and cold isostatic pressing said preliminary shaped body, said fibrous material and said ceramic powder into a shaped body;
   removing said fibrous material from said shaped body; and
   firing said shaped body.

5. The process of claim 4, wherein said fibrous material is at least one member selected from the group consisting of synthetic fiber, piano wire, metal fiber, carbon fiber, ceramic fiber and natural fiber.

6. The process of claim 4, wherein said ceramic powder is at least one material selected from the group consisting of silicon nitride, silicon carbide and partially stabilized zirconia.

* * * * *